March 1, 1955 G. AHLQUIST 2,703,046
HOLDER FOR MEAT AND POULTRY
Filed June 1, 1954
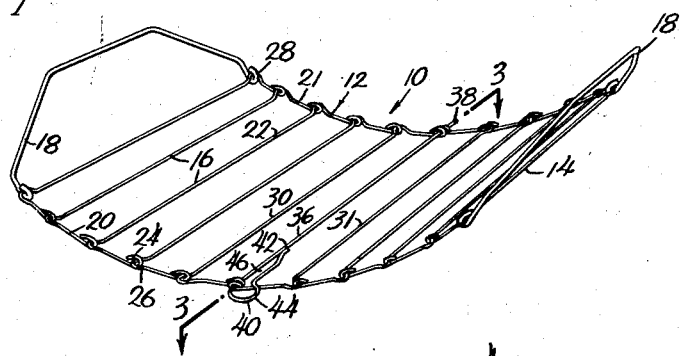
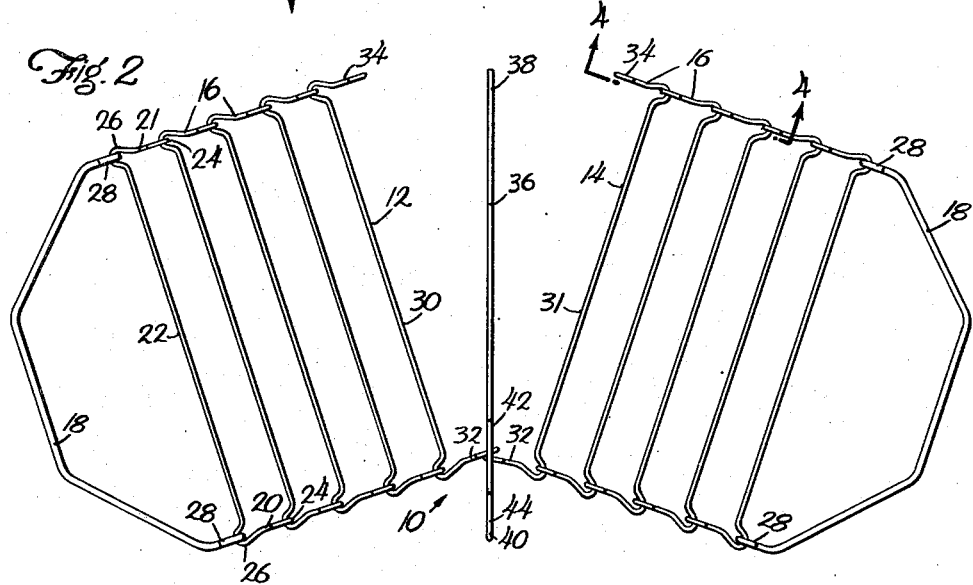
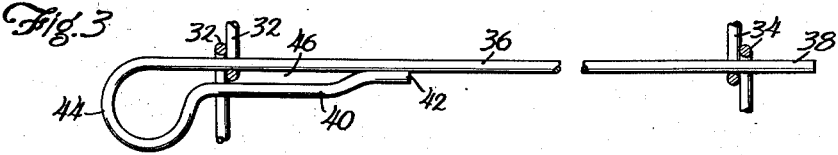
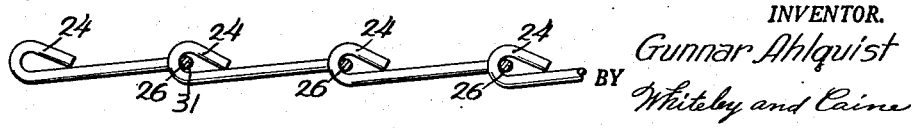
INVENTOR.
Gunnar Ahlquist
BY Whiteley and Caine
ATTORNEYS

United States Patent Office 2,703,046
Patented Mar. 1, 1955

2,703,046

HOLDER FOR MEAT AND POULTRY

Gunnar Ahlquist, Minneapolis, Minn.

Application June 1, 1954, Serial No. 433,444

5 Claims. (Cl. 99—449)

The present invention relates to improvements in a cooking utensil for meats and fowl. In particular it relates to a flexible holder or cradle which may be used to support a large piece of meat or a fowl in a cooking vessel and which can be easily removed from underneath the food when the latter is placed on the platter.

A flexible cradle or holder is particularly useful in lifting meat or fowl into a cooking pan and thereafter for transporting the food from the cooking pan to a suitable platter. Although various cradles or holders for this purpose have been suggested heretofore, none of them are as practical nor as simple as my invention. Further, it is necessary in respect to the prior art devices to leave the flexible cradle underneath the food on the serving platter or to lift the food in some manner so that the cradle may be removed. The former makes an unsightly dish, and the latter destroys the usefulness of the cradle.

Therefore it is an object of my invention to provide a flexible holder or cradle for meats and fowl which may be easily removed from underneath the cooked food without the necessity of first lifting the food from the platter.

Another object of my invention is to provide a cooking utensil for meats and fowl that includes a flexible frame which may be opened at one point on its periphery and is hinged at a point directly opposite the separable point aforementioned.

A further object of my invention is to provide a cooking utensil for meats and fowl which includes a flexible frame that may be opened at one point on its periphery and is hinged at a point directly opposite the separable point aforementioned and having a pin extending between these two opposite points on the periphery of the frame which has one end formed in a loop and acts as a hinge for the separable segments of the frame and its other end in removable engagement with the separable segments of the frame at the separable point on the frame's periphery; the looped end of the pin has a constricted portion that acts to restrict the longitudinal movement of the pin.

These and other objects and advantages of the present invention will be apparent from the following specification and claims; reference being had to the accompanying drawing, wherein:

Fig. 1 is a perspective view of the invention in approximately the position it would assume when in use;

Fig. 2 is a plan view of the invention in its uncoupled position;

Fig. 3 is a sectional view taken on line 3—3 of Fig. 1 and enlarged in size; and Fig. 4 is a sectional view taken on line 4—4 of Fig. 2 and also enlarged in size.

Referring to Figs. 1 and 2, the flexible holder or cradle embodying my invention is designated by general reference numeral 10. Holder 10 is formed of two integrated sections 12 and 14, each section being comprised of a plurality of three sided wire elements 16 and a handle 18. The elements 16 have parallel sides 20, 21 joined by a third side 22. The open ends 24 of the sides 20 and 21 are formed as hooks, see Fig. 4; and the opposite ends of the sides 20 and 21 are joined to the third side 22 by looped portions 26. The elements 16 are secured to one another by engaging the hooked ends 24 over the looped portions 26 of an adjacent element as shown in Fig. 4. Handles 18 likewise have hooked ends 28 which engage the looped portions 26 of an adjacent element 16.

The element 16 which is farthest from the handle 18 in each of sections 12 and 14 have been specifically designated by the numerals 30 and 31. The hooked ends 24 of the elements 30 and 31 are positioned adjacent each other in straddling relationship to form two pairs of overlapping loops 32 and 34, see Figs. 1 and 3. Referring to Fig. 3, the pairs of loops 32 and 34 are engaged by a pin 36 having a straight end 38 and having its opposite end 40 being bent back and secured to the body of pin 36 at point 42. End 40 of pin 36 is bent to form a handle 44 for the pin 36 and also a restricted channel 46.

The operation of my device is as follows. When the pin 36 is engaging both pairs of loops 32 and 34 the holder 10 is an integrated structure as shown in Fig. 1, and it forms a flexible but sturdy cradle for meats or fowl. The restricted channel 46 formed by pin 36 offers some resistance to the longitudinal movement of pin 36 so that it will not become unexpectedly disengaged. In forming the two sections 12 and 14 into the integrated structure shown in Fig. 1, it should be noted, see Fig. 2, that the hooked end 24 of element 31 which forms one of the loops of pair 34, is always positioned on the outside of the adjacent hooked end 24 of element 30. Pin 36 is always secured to the pair of loops 32. This maintains the relationship of the hooked ends 24 forming the pair of loops 32; and the positioning of the hooked ends 24 of the pair of loops 34 aforementioned prevents any movement of the two sections 12 and 14 along the axis of the pin 36 when the pin is in engagement with the pair of loops 34, and maintains the holder 10 as an integrated yet flexible structure.

If the holder 10 has been used to transport food from one place to another and it is desired to remove the holder from underneath the food without the necessity of first lifting the food, handle 44 of pin 36 is pulled outwardly, which forces the pair of loops 32 into the channel 46 and moves end 38 free of engagement with the pair of loops 34. Now, grasping the two handles 18, it is possible to separate the two sections 12 and 14 as shown in Fig. 2, and one is now able to easily slip the two separated sections from underneath the food.

It will be obvious to those skilled in the art that my invention may be modified by many substitutions and equivalents, and this disclosure is intended to be illustrative only. Therefore, I intend to be limited solely by the scope of the appended claims.

I claim:

1. A cooking utensil for meats and fowl comprising, a flexible frame formed of a plurality of integrated elements, a peripheral side of said frame being separable at one point, the separable segments of said frame being hinged at a point on the periphery of said frame directly opposite said separable point to permit an arcual movement of the separated segments of said frame, and a pin extending between said opposite points on the periphery of said frame, said pin having one end always carried by said frame at the hinged point of said frame, said end of the pin being formed in a loop and acting as the hinge for the separable segments of said frame, said pin having a second end adjacent the separable point of said frame, said second end being in removable engagement with the separable segments of the frame at this point.

2. A cooking utensil for meats and fowl comprising, a flexible frame formed of two integrated sets of elements positioned on either side of a center line of said frame, two non-flexible loops carried by each of said integrated sets positioned adjacent the ends of said center line of the frame, each loop of one integrated set being positioned in straddling relationship with the adjacent loop of the second integrated set to form two sets of overlapping loops, a movable pin extending through the two sets of overlapping loops, said pin having one end free to move in and out of position through one set of loops and having its other end always positioned through the second set of loops.

3. A cooking utensil for meats and fowl comprising, a flexible frame formed of two integrated sets of elements positioned on either side of a center line of said frame, two non-flexible loops carried by each of said integrated sets positioned adjacent the ends of said center line of the frame, each loop of one integrated set being positioned in straddling relationship with the adjacent loop on the second integrated set to form two sets of overlapping loops, a movable pin extending through the two sets of overlapping loops, said pin having one end free to move in and out of position through one set of loops and having its other end always positioned through the second set of loops, said last named end of the pin being formed in a loop having a constricted portion which acts to restrict the longitudinal movement of said pin to normally maintain the free end of said pin through the first named set of overlapping elements.

4. A cooking utensil for meats and fowl comprising, a flexible oblong frame formed of two integrated sets of elements positioned on either side of the shorter center line of said frame, two non-flexible loops carried by each of said integrated sets positioned adjacent the ends of said center line of the frame, each loop of one integrated set being positioned in straddling relationship to the adjacent loop of the second integrated set to form two sets of overlapping loops, a movable pin extending through the two sets of overlapping loops, said pin having one end free to move in and out of position through one set of loops and having its other end always embracing the second set of loops, said last named end of the pin being formed in a loop having a constricted portion which acts to restrict the longitudinal movement of said pin to normally maintain the free end of said pin through the first named set of overlapping loops, and two handles positioned at opposite lateral sides of said frame.

5. A cooking utensil for meats and fowl comprising, a flexible frame consisting of a plurality of three sided elements having two parallel sides, each parallel side having one end secured to the third side of said elements and a hook formed in its other end, said elements positioned with their hook ends facing toward a center line of said frame and proceeding transversely from both sides of said center line to the lateral extremities of said frame and secured to one another by looping the hook ends of the parallel sides over the third side of an adjacent element, said frame having at its center line the hook ends of one element straddling the hook ends of the adjacent element to form two sets of overlapping hook ends, a movable pin positioned at the center line of said frame and extending through the two sets of said overlapping hook ends, said pin having one end free to move in and out of position through the hook ends of one set of overlapping elements and having its other end always positioned through the hook ends of the second set of overlapping elements, means carried by said pin for restricting the movement of its free end out of position through the hook ends of the first named set of overlapping elements, and two handles positioned at opposite lateral sides of said frame.

No references cited.